United States Patent

[11] 3,565,141

| [72] | Inventor | Alex J. Galis<br>Albany, Ga. |
|---|---|---|
| [21] | Appl. No. | 817,847 |
| [22] | Filed | Apr. 21, 1969 |
| [45] | Patented | Feb. 23, 1971 |
| [73] | Assignee | Athey Products Corporation<br>Raleigh, N.C.<br>a corporation of Illinois |

[54] HYDRAULICALLY ACTUATED THREE-SHEAR BLADE SHEARING DEVICE FOR FELLING TREES
9 Claims, 11 Drawing Figs.

[52] U.S. Cl. ................................................ 144/34;
144/309
[51] Int. Cl. ........................................................ A01g 23/02
[50] Field of Search ............................................ 144/2(21),
3(4), 34, 34(1—5), 309(34)

[56] References Cited
UNITED STATES PATENTS

| 2,612,194 | 9/1952 | Ingraham et al. | 144/34 |
| 3,421,558 | 1/1969 | Thompson | 144/34 |
| 3,493,020 | 2/1970 | Choat | 144/34 |
| 3,509,922 | 5/1970 | Lundberg | 144/34 |

Primary Examiner—Gerald A. Dost
Attorney—B. B. Olive

ABSTRACT: A timber-shearing apparatus for harvesting timber employs a main sliding, wedge blade which cooperates with a pair of smaller, pivotal blades all of which are remotely actuated by a common fluid cylinder and which collectively act to both center the tree and effect the shearing.

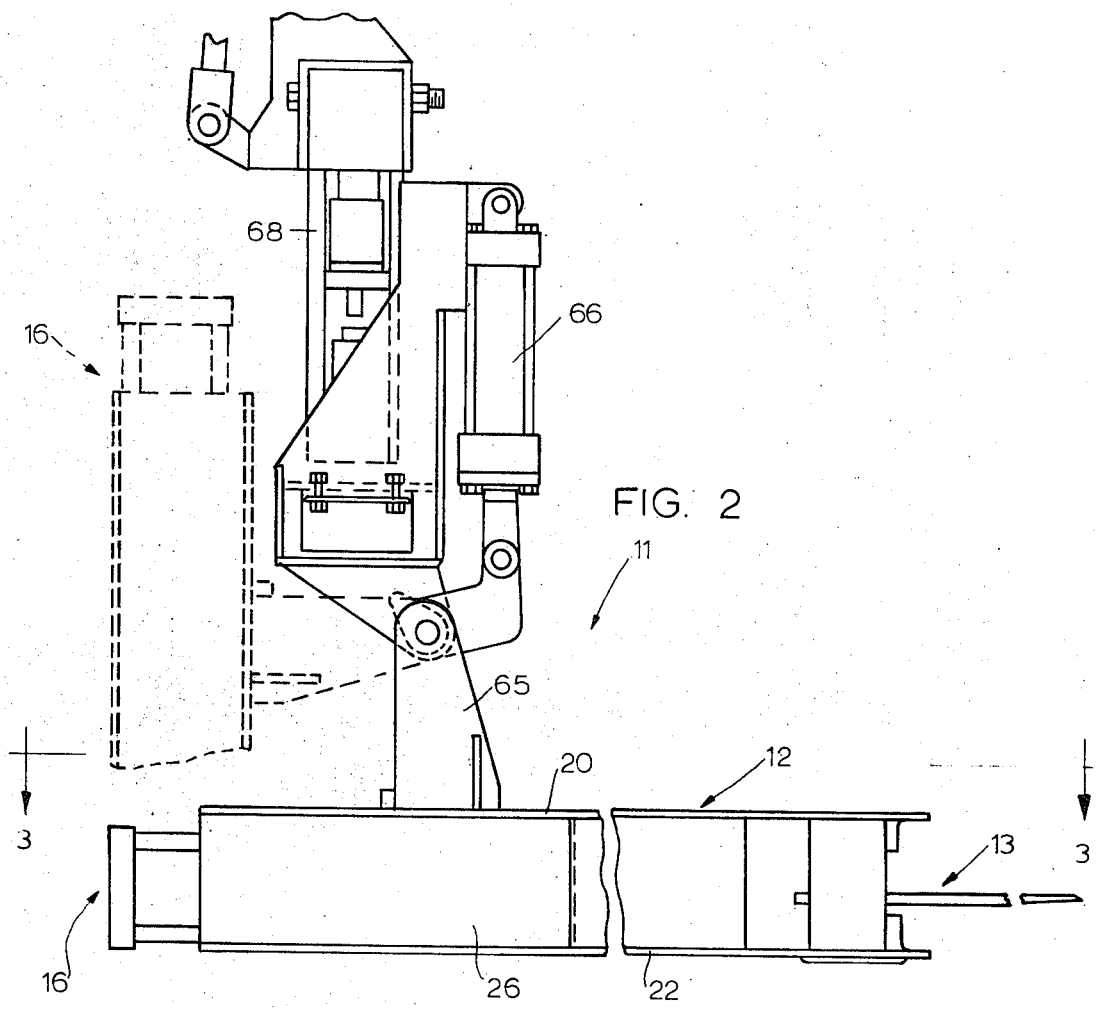
FIG. 2
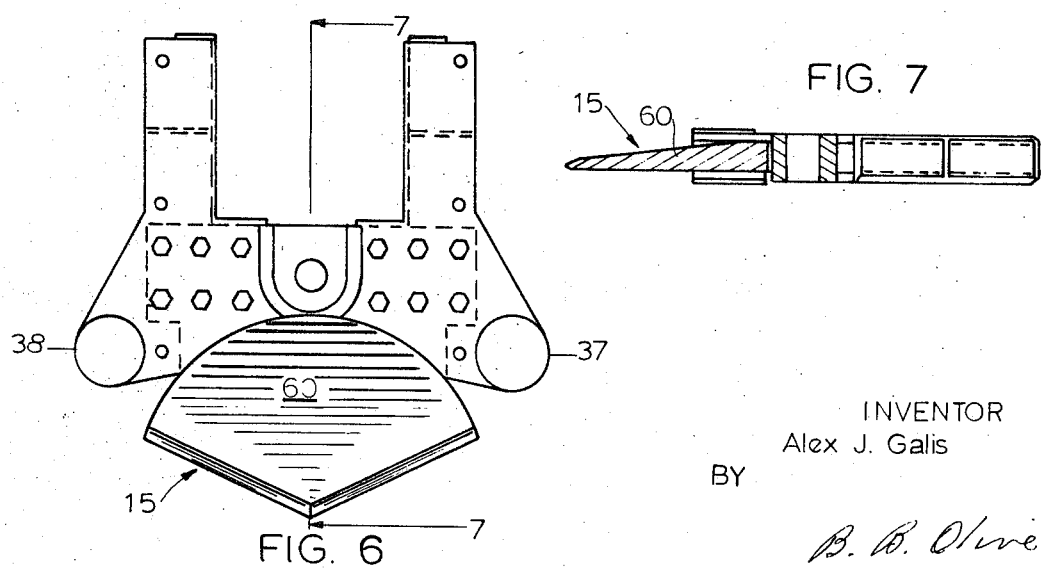
FIG. 6
FIG. 7
INVENTOR
Alex J. Galis
BY
B. B. Olive
ATTORNEY

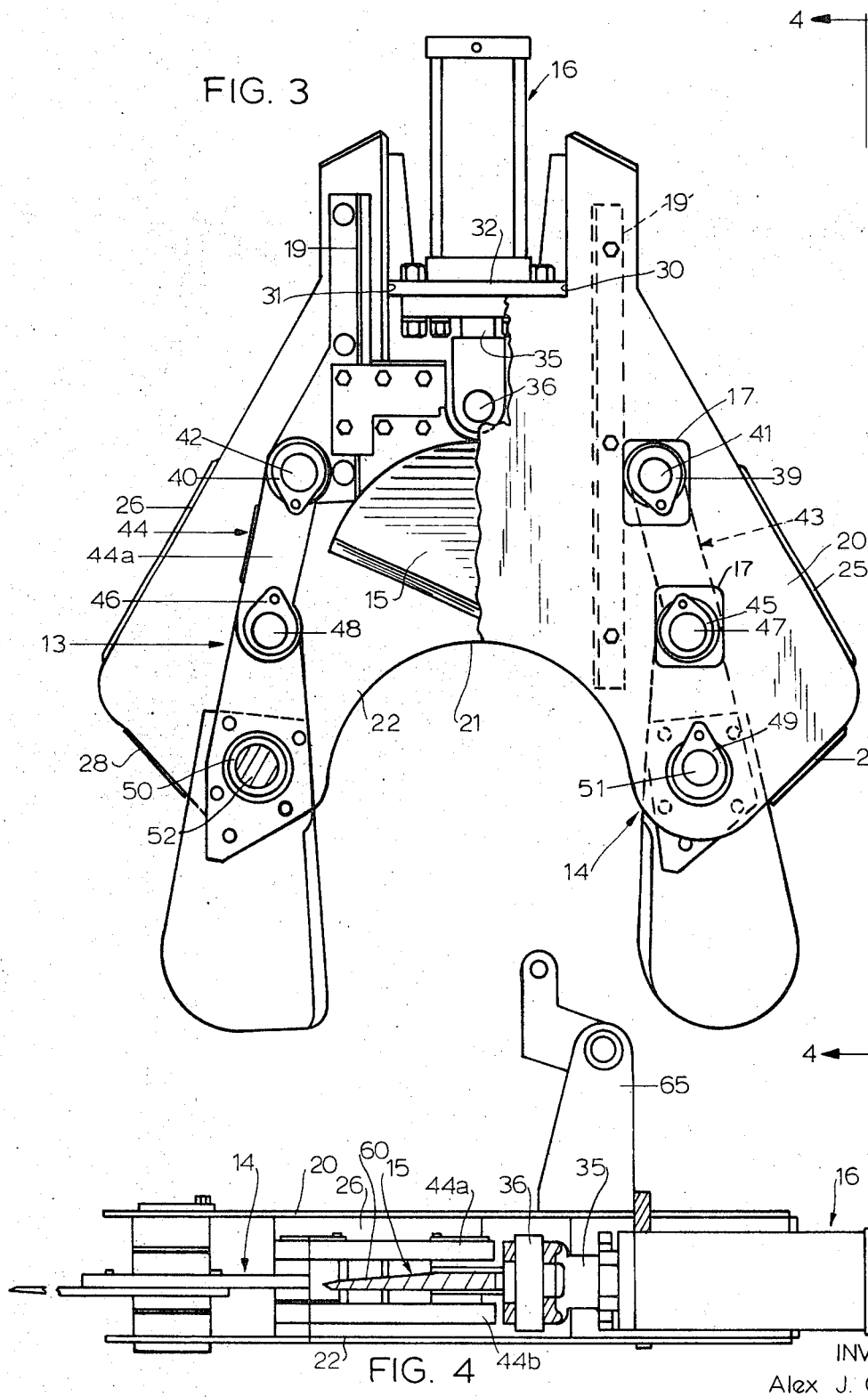

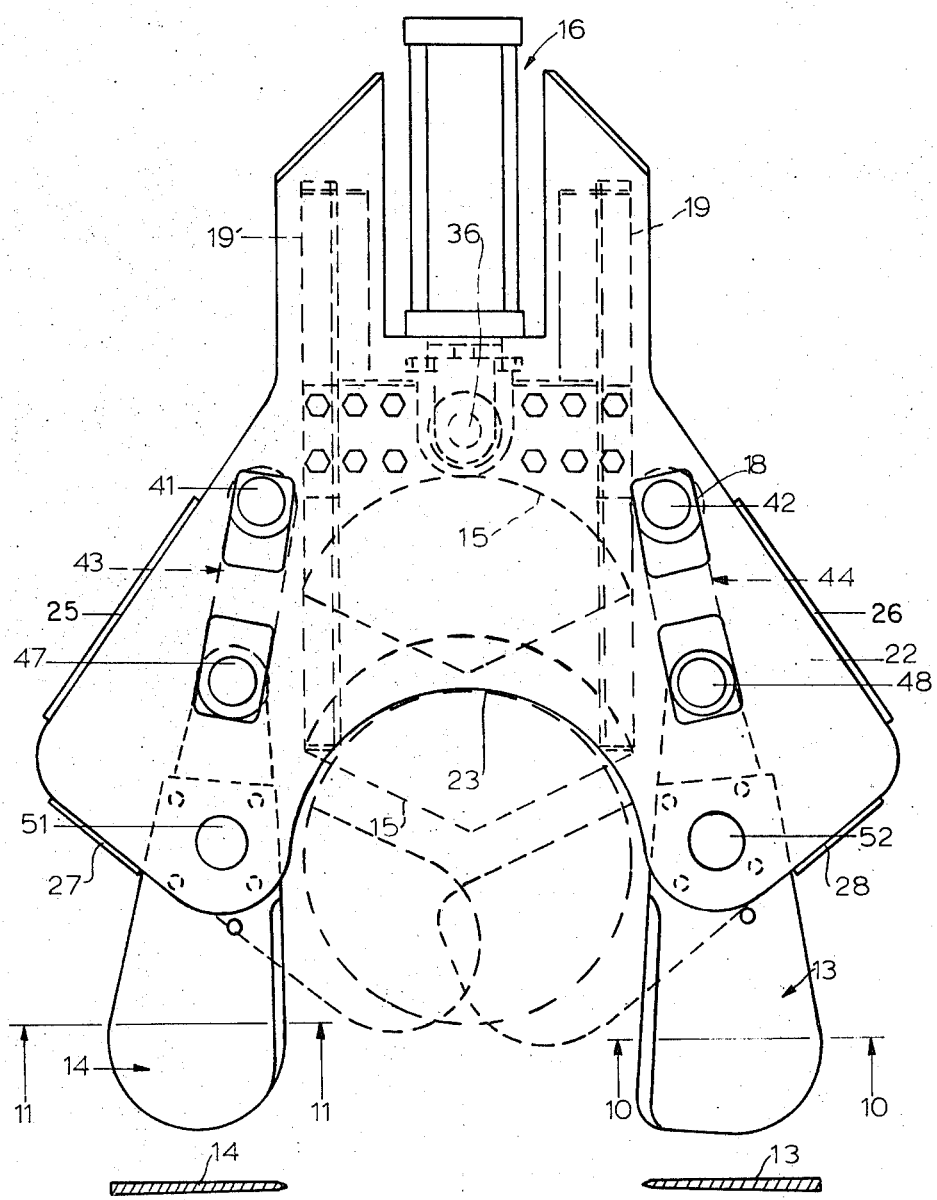
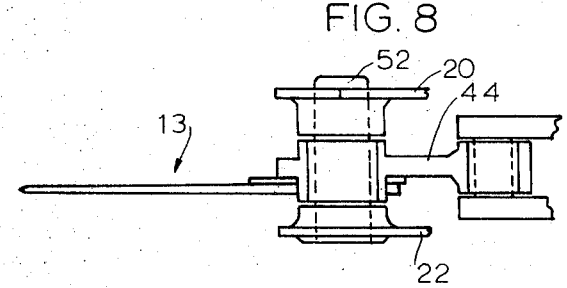

HYDRAULICALLY ACTUATED THREE-SHEAR BLADE SHEARING DEVICE FOR FELLING TREES

BACKGROUND OF THE INVENTION

1. Field of the Invention

This invention relates to tree harvesting and more particularly to fluid cylinder-actuated timber-shearing apparatus which use blades for engaging and shearing a tree.

2. Description of the Prior Art

The most common prior art tree-felling apparatus of the blade shearing type use either a fixed blade member and a pivotal blade controlled by a hydraulic cylinder or use a pair of pivotal blades each of which is individually controlled by a separate hydraulic cylinder.

For example, U.S. Pat. No. 3,327,745, issued to F. W. Meece et al., entitled "Tree Cutter Device" employs a pair of jaw members and a single cutting blade. Although this type of device has increased the rate of felling trees, one particularly bad feature of this type of felling device and other similar devices on the market is that when the single blade reaches a point approximately three-fourths of the distance through the tree, the tree starts falling and when the tree falls, the wood fiber is separated or broken as much as 12 to 18 inches above the cut and fiber is pulled from the heart of the tree.

Another example of prior art is seen in U.S. Pat. No. 3,252,487 entitled "Apparatus For Delimbing And Felling Trees" and issued to R. W. Larson et al. This apparatus has partially solved the problem of fiber splintering by using two blades to perform the severing of the tree. A more complete cut is made through the trunk. However, in the apparatus of Larson et al. two hydraulic cylinders are required to accomplish the shearing with attendant extra cost and upkeep.

Three further prior art patents which cover apparatus having at least some of the disadvantages discussed above are U.S. Pat. No. 2,565,252, issued to C. McFaull and entitled "Power Actuated Shearing Tree And Brush Cutter," U.S. Pat. No. 3,183,954, issued to R. W. Larson and entitled "Shears" and U.S. Pat. No. 3,122,184, issued to R. W. Larson and entitled "Hydraulically Actuated Timber Shear."

The aforesaid cited patents are believed to collectively and fairly represent prior art practice so far as the same is presently known. It can thus be said that, in general, the prior art does not teach employment of a three-blade shear for felling trees. More specifically, the prior art does not teach a three-blade shear which effects a clean cut nor a remotely controllable three-blade shear which is arranged to be operated by a single fluid cylinder.

SUMMARY OF THE INVENTION

The hydraulically operable three-blade shearing device of this invention includes one large main shearing blade and two smaller auxiliary shearing blades. The main blade slides on a supporting frame and the auxiliary blades pivot about pins fixed on the frame. The frame, blades and a supporting boom are all remotely positionable from a mobile support, i.e. a conventional skidder. By means of short connecting links, the auxiliary blades are rotated to the closed position as the large main sliding blade moves forward in the frame. This movement is controlled by a single hydraulic cylinder. The frame and blade assembly which includes the mentioned main and auxiliary blades and frame is mounted so that it is free to move back and forth or to either side and the blades form a pattern in closing that will tend to center the shear mechanism with the tree. The larger main sliding blade is also designed to give direction to the falling tree. The upper surface of the large main blade at a point back a predetermined distance from the foremost point forms a lifting wedge and the outer edge of the smaller blades are tapered away from the shearing edge. With the tree centered the large blade will direct the falling tree as desired and away from the shear mechanism. The shearing edges of the blades operate in substantially the same common plane but are staggered just enough to allow a slight overlap in the fully closed position to insure a complete and clean cut of the tree section being sheared.

The shearing device of the invention is pivotally mounted on a boom which in turn mounts on a conventional skidder. Complete clockwise or counterclockwise rotation of the shearing mechanism is obtained. Also, the shear head assembly itself can be independently rotated so that a horizontal shearing position for shearing upright trees can be achieved as well as a vertical shearing position for shearing trees which have already been felled.

The object of the invention can be said to be substantially improve on existing tree shearing apparatus by providing a three-bladed shearing apparatus which provides a cleaner cut, is simpler in construction and is more adaptable to work conditions.

DESCRIPTION OF THE DRAWINGS

FIG. 2 is an enlarged fragmentary elevation view of the shearing head rotated into a horizontal cutting position and in dashed lines in a vertical cutting position.

FIG. 3 is a fragmentary partially sectioned top plan view of the shearing head of FIG. 2.

FIG. 4 is a side elevation partially sectioned view of the shearing head of FIG. 3.

FIG. 5 is a bottom plan view of the assembled shearing head and showing in solid lines the open, noncutting position and in dashed lines the closed, cutting position near the end of the cut.

FIG. 6 is a plan view of the main wedge blade and its mounting chamber.

FIG. 7 is an elevation section view of the FIG. 6 wedge blade member taken along line 7-7 of FIG. 6.

FIG. 8 is a fragmentary side elevation view of one of the pivotal auxiliary shearing blade members.

FIG. 9 is a side elevation view showing the shearing apparatus in a position for a horizontal cut immediately adjacent the ground.

FIG. 10 is an elevational section view of one of the auxiliary blade members taken along line 10-10 of FIG. 5.

FIG. 11 is an elevational section view of the second auxiliary blade member taken along line 11-11 of FIG. 5.

DESCRIPTION OF THE PREFERRED EMBODIMENT

Figure 1:
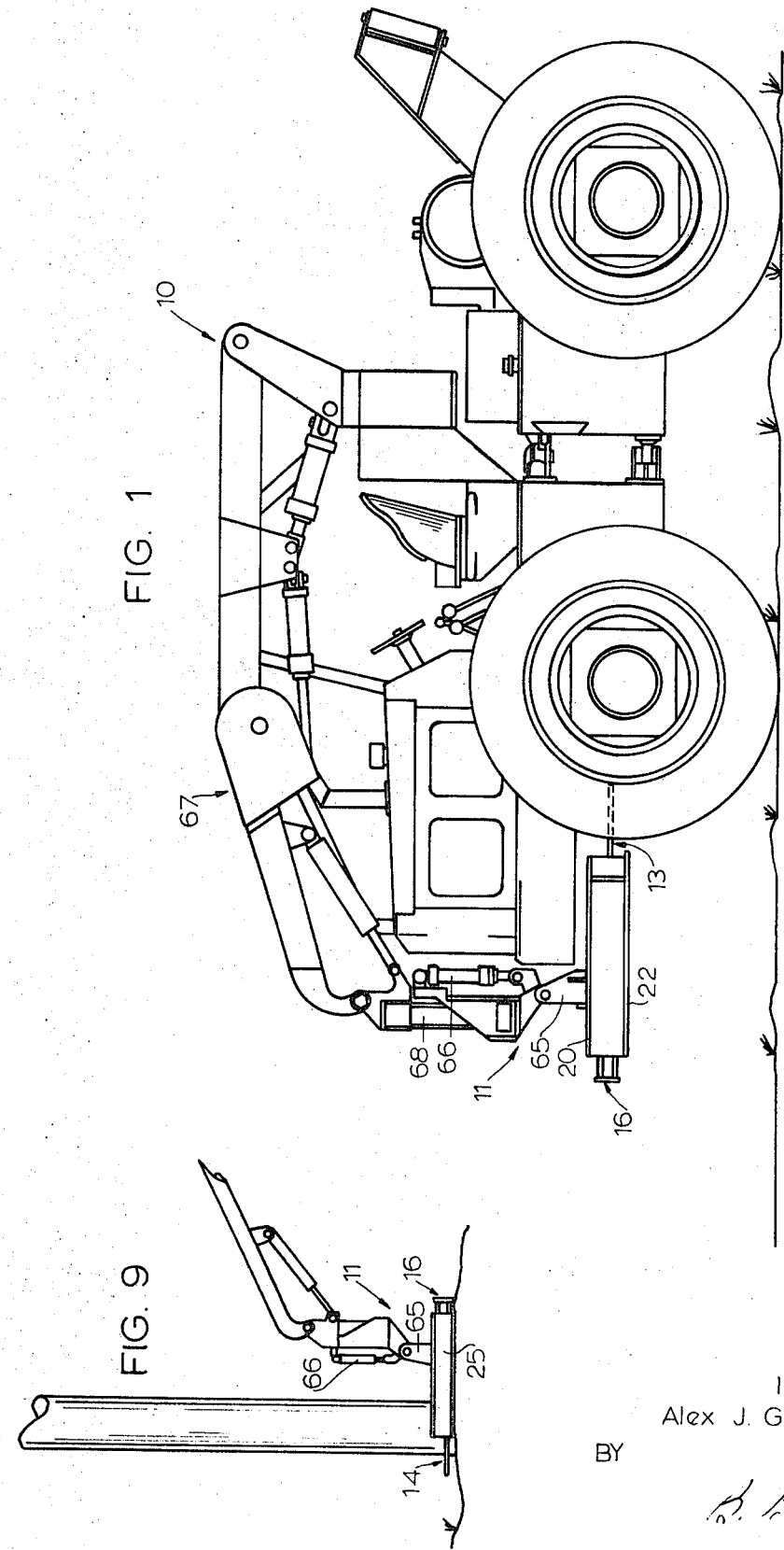
FIG. 1 is a side elevation view of a skidder equipped with the timber-shearing apparatus of the present invention, with the shearing head rotated into a travel position.

Referring to the drawings and particularly to FIG. 1, 10 represents a conventional skidder upon which the timer timber-shearing device of this invention is mounted.

The apparatus to which the invention is primarily directed will be referred to generally as timber shear head unit 11 which will is boom mounted and remotely positionable from skidder 10. The main elements comprising shear head unit 11 are a frame 12, pivotal auxiliary blade assemblies 13, 14, a sliding main wedge blade assembly 15 and hydraulic cylinder 16.

Frame 12 consists of an upper coverplate 20 having a U-shaped opening 21 and a lower coverplate 22 having a mating U-shaped opening 23. For maintenance purposes four openings 17, are provided in plate 20 (two being shown in FIG. 3) and four mating openings 18 are provided in plate 22. Frame 12 also has side plates 25, 26 to which coverplates 20, 22 are rigidly secured. End plates 27, 28 serve as support members for coverplates 20, 22. Coverplates 20, 22, side plates 25, 26 and end plates 27, 28 protect the working elements as well as provide a cradle support for the timber being cut as will subsequently become apparent.

Referring now particularly to FIGS. 3, 4, 5, 6, 7, and 8, the description will be directed to the main sliding wedge blade assembly 15 and the pivotal auxiliary blade assemblies 13, 14.

Hydraulic cylinder 16 is rigidly secured to frame 12 by means of welding as at 30, 31 where plate 32 of cylinder 16 is made integral with top cover 20. Piston rod 35 of cylinder 16 is secured to sliding wedge blade assembly 15 by means of pin 36. Blade assembly 15 is adapted to slide between rails 19, 19' between coverplates 20, 22 and along a fixed linear and centrally located path. Once cylinder 16 is energized, piston rod 35 will extend and in turn force the entire main blade assembly 15 shown in FIG. 3 outwardly. Extensions 37, 38 of the main blade assembly 15 have bearings 39, 40 mounted respectively therein. Pins 41, 42 pivotally secure a pair of short connecting links 43, 44 respectively to extensions 37, 38 of main blade assembly 15. Link 43, shown in dashed lines in FIG. 3, is identical in construction to link 44. Links 43, 44 are made up of a pair of members 43a, 43b (not shown) and 44a, 44b (see FIG. 4). A pair of bearings 45, 46 having pivot pins 47, 48 respectively extend through members 43a, 43b, 44a, 44b of links 43, 44. Pins 47, 48 pivotally receive a pair of pivotal blades 13, 14. The respective auxiliary blades 13, 14 are pivotally secured to coverplate 20 and bottom plate 22 by means of bearings 49, 50 and pivot pins 51, 52 which pass through coverplate 20 and bottom plate 22. Auxiliary blades 13, 14 can thus pivot in arcuate paths around points established by pins 51, 52 and which are lateral of the line of movement of the main blade 15. Cylinder 16 is thus rigidly secured to frame 12 and pivotal blade assemblies 13, 14 are pivotally secured to frame 12. Links 43, 44 are however pivotally secured to blade assembly 15 and also to blade assemblies 13, 14. Linear sliding movement of the main blade 15 thus effects simultaneous arcuate movement of the auxiliary blades 13, 14.

In operation, once cylinder 16 is energized the main sliding wedge blade 15 first starts to move with respect to plates 20, 22 and considerable force is required to push the pivoting blades 13, 14 into the material and the material, i.e. the tree section, tends to center and to be substantially enclosed and surrounded by the blades. However, at this point, in just starting to close, blade contact with the material is at a minimum. As the main sliding wedge blade 15 continues to slide and move into the material, the angles of connecting links 43, 44 changes quickly. This action reduces the cylinder 16 force requirements for the pivoting blades 13, 14 and such action occurs as the force requirements are increasing for wedge blade assembly 15 due to increased blade edge contact and the lifting section of the wedge 60. By means of the short connecting links 43, 44, the pivotal blades 13, 14 are thus rotated to the closed position as the main sliding wedge blade continues to slide and move forward in frame 12. This movement is of course controlled by hydraulic cylinder 16. By utilizing three blades the final cut is clean and is taken through the heart of the material and there is far less of the customary and undesired fracturing of wood fiber.

The cutting edges of the blades operate in substantially the same common plane as previously mentioned but are staggered just enough to allow a slight overlap in the fully closed position to insure a complete shear or cut. The shape of the main sliding blade 15 is also designed to give direction to the falling tree. For this purpose the upper surface of blade assembly 15 forms a tapered, lifting wedge 60 and the outer edge surfaces of the pivotal blades 13, 14 are also preferably tapered away from the cutting edge. It will of course be appreciated that different woods may require different angles of attack in the cutting edges. The complete shear head unit 11 is mounted so that it is free to move back and forth or to either side and as previously mentioned blades 13, 14 and 15 form a pattern in closing that will tend to center the shear body with the tree. With the tree centered, sliding wedge blade assembly 15 will direct the falling tree as desired and away from skidder 10 occupied by the operator and who may, of course, remotely control both the illustrated boom, the shear assembly and the blades.

The entire shear head unit 11 may furthermore be pivoted 90° by means of pivotal hinges 65 which are integral with frame 12. FIG. 2 illustrates in solid lines the horizontal and in dashed lines the vertical shearing position of shear head unit 11 which positioning is effected by cylinder 66. Also, shear head unit 11 can be raised to any level by boom arrangement 67, mounted on skidder 10. The entire shearing head unit 11 may also be rotated a complete 360° for ease in positioning for a cut. Revolving cylinder unit 68 allows for this revolving of shearing head unit 11. Therefore, substantially any desired working position may be remotely obtained and maintained by the operator without having to move skidder 10. Since such hydraulic positioning apparatus is illustrated in the drawings and is generally conventional it is not deemed necessary to describe the same in any further detail.

When in operation, skidder 10 is moved into position adjacent a standing tree desired to be cut. The operator positions the shearing head unit 11 against the section of tree to be cut so that the tree trunk rests as near U-shaped opening 21 as is possible and so that the blades effectively enclose the section. Cylinder 16 is energized which in turn causes the main sliding wedge blade assembly 15 to be moved outwardly along its linear path. At the same time pivotal blades 13, 14 are moved arcuately through the links 43, 44. The tree is cut clean and completely through and the wedge action of the main blade 15 forces the tree to fall away from skidder 10. Several cuts can be made without having to reposition skidder 10 since the boom structure 67 allows rotation of the shearing head unit 11 through 360°. Boom 67 may also, if desired, be of the telescoping type and an even greater area of timber may be cut without moving skidder 10.

It will be noted that the main blade shearing edge is shown as comprising two straight, rearwardly diverging and scarfed or tapered edges and each auxiliary blade is shown as having its major portion constituting a substantially arcuate shearing edge and such shapes have been proved useful and practical. The precise cutting action may vary from tree to tree due to knots, defects, varying fiber etc., but what often happens is that once the tree is fully engaged by all of the blades the main cutting action may actually be effected by one of the auxiliary blades. Nevertheless, it will be understood that various wood and work conditions may dictate other cutting actions and edge shapes without departing from the basic three-blade concept.

I claim:

1. A tree-shearing apparatus, comprising:
   a. mobile support means having a remotely adjustably positionable boom mounted thereon;
   b. a frame supported and remotely adjustably positionable on said boom;
   c. a set of shear blades operably supported by said frame and including a main shear blade and a pair of auxiliary shear blades, said auxiliary blades being disposed forwardly and outwardly of said main shear blade, all said blades being arranged to operate in substantially the same common plane and having respective opposed cutting edges, said main shear blade being adapted to move on said frame along a fixed linear path centrally thereof, and said auxiliary blades each being adapted to pivot on said frame in arcuate paths around pivotal points located laterally of said linear path; and
   d. remotely controllable actuating and linkage means mounted on said frame and being effective upon the presence of a tree section being positioned so as to be within and effectively surrounded by said blades to cause said main shear blade to move forwardly along said linear path and each said auxiliary blade to simultaneously pivot rearwardly along its respective arcuate path and toward said main shear blade to thereby effect shearing of said tree section.

2. A tree-shearing apparatus as claimed in claim 1 wherein said actuating and linkage means includes and is adapted to be operated with the employment of a single fluid actuated cylinder mounted on said frame.

3. A tree-shearing apparatus as claimed in claim 1 wherein said actuating and linkage means includes a single fluid actuated cylinder mounted on said frame and connected to operate said main shear blade and includes linkage connecting said main shear blade and said auxiliary shear blade such that said linear movement of said main shear blade effects said arcuate movements of said auxiliary shear blades.

4. In a tree-shearing apparatus as claimed in claim 1 wherein said main shear blade is tapered to provide increasing thickness rearwardly of the shearing edge thereof and during shearing to effect a lifting action on said section being sheared.

5. In a tree-shearing apparatus as claimed in claim 4 wherein the shearing edge of said main shear blade comprises a pair of substantially straight edges which diverge rearwardly and the respective shearing edges of said auxiliary shear blades each comprise substantially arcuated edges.

6. In a tree-shearing apparatus as claimed in claim 1 wherein said frame provides an inwardly curved surface adapted to abut said section and in cooperation with said linear and arcuate movements of said blades to center said section preparatory to being sheared.

7. In a tree-shearing apparatus as claimed in claim 1 wherein said blades are arranged such that the said shearing edges thereof at least slightly overlap when in the final stage of shearing said section.

8. In a tree-shearing apparatus as claimed in claim 2 wherein said fluid actuated cylinder comprises a hydraulic cylinder.

9. In a tree-shearing apparatus as claimed in claim 1 wherein said adjustably positionable boom and frame adapt said set of shear blades for forward and rearward, up and down, right and left and rotary positioning movements.